(12) United States Patent
Socher

(10) Patent No.: US 7,430,868 B2
(45) Date of Patent: Oct. 7, 2008

(54) METHOD OF OPERATING A THERMAL POWER PLANT

(75) Inventor: Bernd Socher, Birr (CH)

(73) Assignee: Alstom Technology Ltd, Baden (CH)

( * ) Notice: Subject to any disclaimer, the term of this patent is extended or adjusted under 35 U.S.C. 154(b) by 47 days.

(21) Appl. No.: 11/529,627

(22) Filed: Sep. 29, 2006

(65) Prior Publication Data

US 2007/0068168 A1    Mar. 29, 2007

Related U.S. Application Data

(63) Continuation of application No. PCT/EP2005/051367, filed on Mar. 24, 2005.

(30) Foreign Application Priority Data

Mar. 31, 2004    (CH) .................................. 00557/04

(51) Int. Cl.
*F02C 9/00*    (2006.01)
*F02C 9/26*    (2006.01)

(52) U.S. Cl. .......................... 60/773; 60/776; 60/39.281

(58) Field of Classification Search .................... 60/772, 60/773, 776, 39.281

See application file for complete search history.

(56) References Cited

U.S. PATENT DOCUMENTS

| | | | |
|---|---|---|---|
| 5,272,637 A | 12/1993 | Urushidani et al. | |
| 5,307,620 A | 5/1994 | Hamahira et al. | |
| 5,609,016 A * | 3/1997 | Yamada et al. | ........... 60/39.281 |
| 6,082,095 A | 7/2000 | Akimaru | |
| 6,145,318 A | 11/2000 | Kaplan et al. | |
| 6,484,490 B1 | 11/2002 | Olsen et al. | |

FOREIGN PATENT DOCUMENTS

| | | |
|---|---|---|
| DE | 846 038 | 8/1952 |
| DE | 42 11 681 A1 | 10/1992 |
| DE | 42 21 805 A1 | 1/1994 |
| DE | 195 49 141 A1 | 7/1997 |
| EP | 1 310 647 A1 | 5/2003 |
| GB | 1093793 | 12/1967 |

OTHER PUBLICATIONS

International Search Report dated Jun. 23, 2005.
Form PCT/ISA/237 (Written Opinion of the International Searching Authority).
Swiss Search Report dated Jun. 25, 2004 (with English translation of category of cited documents).

* cited by examiner

*Primary Examiner*—Ted Kim
(74) *Attorney, Agent, or Firm*—Buchanan Ingersoll & Rooney PC

(57) ABSTRACT

A method of operating a thermal power plant, such as a gas turbine power plant, in which a rotary unit, such as at least one gas turbine stage, is driven by burning gaseous fuel inside a combustion chamber, with hot gases being formed, the rotary energy of which rotary unit is converted into another form of energy, such as electrical energy. A load set point (L) of the thermal power plant is set by regulating the quantity of gaseous fuel fed to the combustion process. The thermal power plant is operated at a load set point (L), provided the gaseous fuel is fed to the combustion process through a gas line at a gas pressure $p_{gas}$, with $$p_{gas} > p_{action\ limit}(L),$$

where $p_{action\ limit}(L)$ represents a pressure value which depends on a system internal pressure $p_{system\ requirement}(L)$ set in the region of the combustion chamber by the load set point (L) of the thermal power plant, with $$p_{action\ limit}(L) > p_{system\ requirement}(L).$$

15 Claims, 1 Drawing Sheet

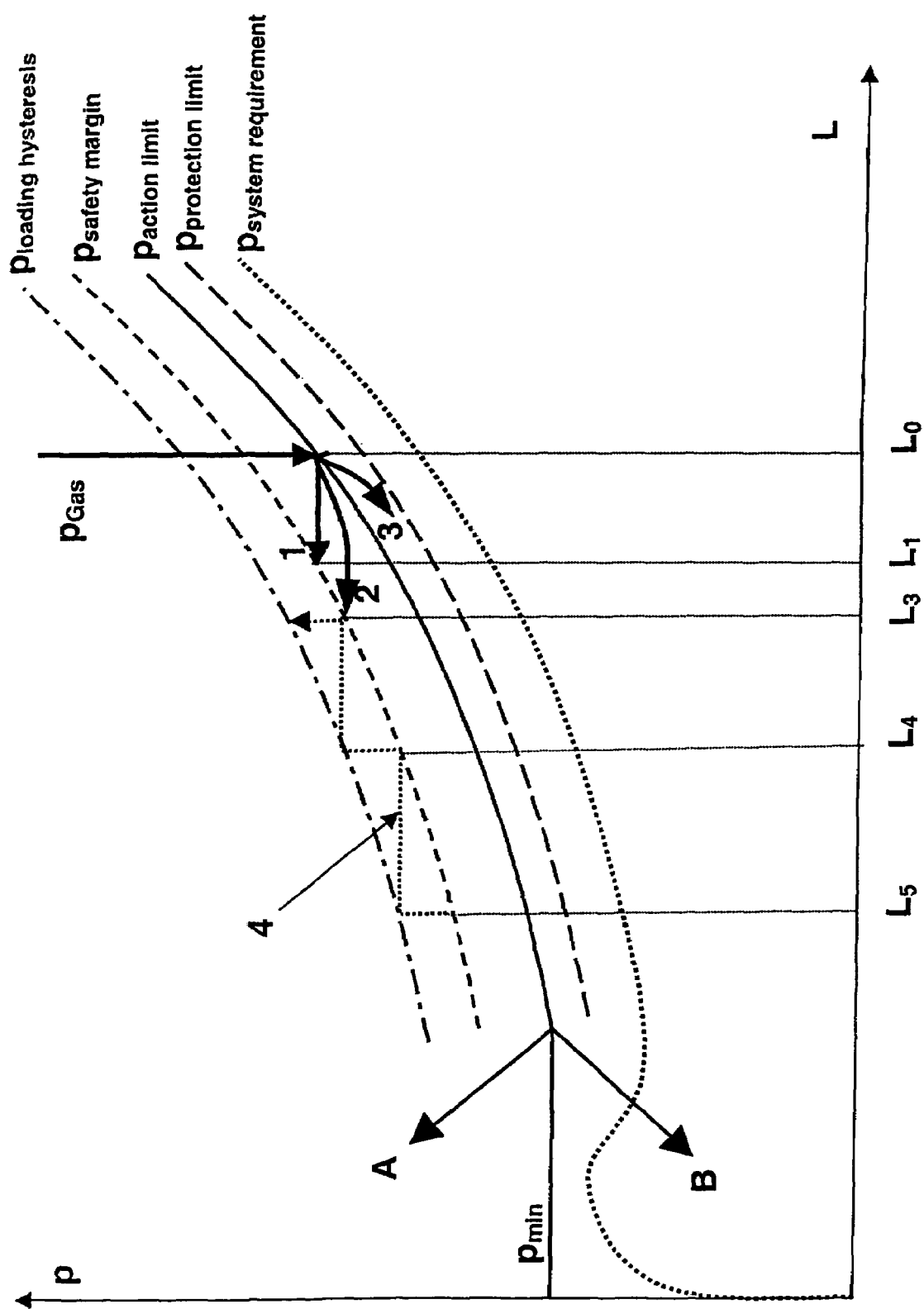

METHOD OF OPERATING A THERMAL POWER PLANT

CROSS-REFERENCE TO RELATED PATENT APPLICATIONS

This application claims the benefits of Swiss Patent Application No. 00557/04, filed on Mar. 31, 2004, and is a continuation of and International Patent Application No. PCT/EP2005/051367, filed on Mar. 24, 2005, the disclosures of which are incorporated herein in their entireties by reference.

TECHNICAL FIELD

The invention relates to a method of operating a thermal power plant, preferably a gas turbine power plant, in which hot gases are produced by the firing of a combustion chamber, the kinetic fluidic energy of which is converted at least partly during flow through a rotary machine into rotary energy and ultimately, by means of a generator arrangement connected to the rotary machine, into electrical energy for feeding into a power grid.

For reasons of safety, but likewise also for economical reasons, it is necessary to reliably operate a thermal power plant conceived in particular for the generation of electrical energy, so that the operating agency of the thermal power plant can rapidly call for electrical energy on demand. As already mentioned above, gas turbine power plants are the focus of further considerations, especially since such thermal power plants are widely used for power generation. In most cases, gas turbine power plants are fired with gaseous fuel, which is provided via suitable gas lines for combustion in the gas turbine power plant.

In a gas turbine power plant operated with gaseous fuel, special consideration is given to the pressure ratio between the system pressure arising inside the combustion chamber as a function of the load set point of the gas turbine power plant by means of the compression of the combustion supply air and the gas line pressure at which the gaseous fuel is fed to the combustion process. Under normal operating conditions, the gas line pressure is always greater than the load-dependent combustion chamber pressure. In cases in which the gas line pressure of the fed fuel drops into the range of the load-dependent combustion chamber pressure, it is especially necessary to make sure that a drop in the gas line pressure below the combustion chamber pressure can be avoided at all events. If the gas line pressure were to drop below the combustion chamber pressure, flashback of flame into the gas feed line would put the operating safety of the entire fuel supply at risk. Hot gases could at least penetrate into the fuel feed line system, as a result of which the fuel feed comes to a complete standstill and the burner flame is extinguished. In this case, the gas turbine plant is out of commission for power generation for a considerable period, especially since extensive and time-consuming measures are necessary in order to run the plant up to speed again until a required rated load is reached.

For said reasons, care is therefore to be taken to avoid the consequences of the with the drop in the gas line pressure below the combustion chamber operating pressure.

In order to protect gas turbine power plants from the consequences of an unforeseen pressure drop in the gas feed line, very strict operating limits have been established, and if these operating limits are exceeded, respectively in the event of a pressure drop in a gas feed line, if the gas pressure falls below a minimum value, a protective measure is automatically initiated, namely immediate deloading of the gas turbine by reduction of the fuel feed in such a way that the gas turbine power plant is completely run down or shut down. This measure certainly serves for protection against irreversible damage to individual gas turbine components, in particular to all those which participate in the combustion process, but complete deloading of the gas turbine power plant always involves a considerable reduction in the economical availability, as explained at the beginning.

SUMMARY OF THE INVENTION

The object is therefore to specify a method of operating a thermal power plant, in particular for operating a gas turbine power plant, by means of which ultimately electrical energy can be generated for feeding into a power grid, in such a way that the availability of the thermal power plant is to be improved, i.e., in particular in cases in which the gas line pressure in the fuel supply system drops, it is necessary to search for alternative control mechanisms which do not necessarily lead to an emergency shutdown of the entire thermal power plant. In addition, however, it is likewise necessary to fully comply with the safety standards which are imposed on a thermal power plant in operation.

The general idea of the invention relates in principle to all thermal power plants in which hot gases are produced by burning gaseous fuel inside a combustion chamber, by means of which hot gases a rotary unit is driven, the rotary energy of which is converted into another form of energy, preferably into electrical energy. In this case, the rotary energy inherent in the rotary unit represents the "load set point" of the thermal power plant, which load set point is set by regulating the quantity of the gaseous fuel fed to the combustion process and can be regarded as an equivalent variable for the electrical energy fed into a power supply grid. Depending on the energy demand prevailing in the power grid, the load set point is to be correspondingly adapted by regulating the fuel feed.

Without restricting the general idea of the invention with regard to the mode of operation of thermal power plants of the generic type, the further comments are directed toward a gas turbine plant which is designed for the generation of electrical energy and which is to be regarded as being typical of the thermal power plant in question.

The method according to the invention according to the preamble of patent claim 1 in principle provides active control of the load set point of a gas turbine power plant, this active control being determined not only by the demand for electrical energy in the power grid, as in the case of the gas turbine plant in operation hitherto, but also by the gas pressure currently prevailing in the gas supply system. In particular, the active control of the load set point of gas turbine plant is based on the ratio of the current gas pressure in the gas feed line and at least one pressure level equivalent to the current combustion chamber pressure which depends on the load set point.

In detail, the method according to the invention can be described as follows:

In a manner known per se, the gas turbine power plant is operated at a load set point which is ultimately determined by the demand for energy by the user, provided the gaseous fuel is made available for feeding into the combustion chamber through a gas line at a gas pressure $p_{gas}$ which is always above the current combustion chamber internal pressure $p_{system\ requirement}$ which depends on the respective load set point.

Starting from the combustion chamber internal pressure $p_{system\ requirement}$ forming inside the combustion chamber due to the combustion process, a reference pressure $p_{action\ limit}$ increased relative to the combustion chamber internal pressure is defined, this reference pressure $p_{action\ limit}$ depending, like the combustion chamber internal pressure $p_{system\ requirement}$, on the load set point and preferably being above the system-related combustion chamber internal pressure $p_{system\ requirement}$ by a pressure difference which can be preset at a constant value.

In order to satisfy the high safety standard, and what is more make it stricter for the method according to the invention, as a limiting criterion for the normal operation of a gas turbine power plant which is at a load set point determined by power-grid requirements, the following is additionally required: $p_{gas} > p_{action\ limit}$, i.e. the fuel feed required for the combustion process is determined as a function of the energy demand at the grid, this energy demand ultimately establishing the load set point of the gas turbine plant, provided the gas pressure $p_{gas}$ is always above the load-dependent reference pressure level $p_{action\ limit}$ which in turn is above the combustion chamber pressure $p_{system\ requirement}$.

If the gas turbine power plant is at an initial load set point at which the gas line pressure $p_{gas}$ drops, for whatever reasons, and reaches the pressure value $p_{action\ limit}$ predetermined at the initial load set point, "standard deloading" is effected, during which the quantity of gaseous fuel fed to the combustion process is reduced, with a fuel throttle rate depending on the respective type of gas turbine power plant being preset.

The load which prevails at the initial load set point is automatically reduced by this measure, as a result of which the system-related combustion chamber pressure automatically decreases.

Since the reference pressure level $p_{action\ limit}$ depending on the load set point is always above the system-related combustion chamber pressure $p_{system\ requirement}$, which likewise depends on the load set point, the pressure difference provided between both pressure levels permits a type of buffer zone, by means of which the further behavior of the gas pressure $p_{gas}$ prevailing in the gas feed line, in particular in relation to the reference pressure $p_{action\ limit}$ which depends on the load set point, can be observed before a further measure, such as an emergency shutdown for example, is initiated.

Thus, the further method, depending on a pressure ratio between the gas pressure $p_{gas}$ and the load-dependent reference pressure $p_{action\ limit}$ forming during reduction of the load, makes provision on the basis of a decision criterion either for the standard deloading to be ended and for the gas turbine power plant to be returned to its initial load set point, for complete emergency load shedding to be carried out, during which the fuel reduction is effected more rapidly than in the case of the standard deloading, or for the fuel supply to be changed over to another type of fuel, provided the gas turbine power plant has a dual fuel supply.

If standard deloading which has become necessary due to a drop in the gas pressure $p_{gas}$ to the pressure level $p_{action\ limit}$ leads to stabilization of the gas pressure $p_{gas}$, the gas pressure $p_{gas}$ always being greater than the reference pressure $p_{action\ limit}$ due to the load reduction, the gas turbine power plant can be returned again to its initial load set point on the basis of a specific load build-up.

By means of the method according to the invention, it is therefore possible to safely operate gas turbine power plants even at reduced gas pressure $p_{gas}$ without at the same time initiating an emergency shutdown, as a result of which the availability and ultimately the efficiency of gas turbine power plants can be considerably increased.

Only in cases in which the gas pressure $p_{gas}$ continues to drop despite standard deloading are emergency shutdowns unavoidable in order to ensure safety of operation and the avoidance of irreversible damage. In cases in which gas turbine power plants have a dual fuel supply, i.e. can be operated with both gaseous and liquid fuel, the fuel supply can be changed over from gas feed to liquid feed as an alternative to the emergency shutdown.

BRIEF DESCRIPTION OF THE DRAWING

The method according to the invention is to be described with reference to an exemplary embodiment shown in the single FIGURE. The FIGURE shows a p/L diagram, in which the pressure p is plotted along the ordinate and the load set point L is plotted along the abscissa.

In principle, it is necessary to always keep the gas pressure $p_{gas}$ higher than the system-related combustion chamber pressure $p_{system\ requirement}$ forming as a function of the load set point L if it is intended to prevent the consequences explained at the beginning from occurring, which consequences inevitably lead to irreversible damage to all the components participating in the combustion process.

During the ignition of a gas turbine power plant, care is to be taken to ensure that the gas pressure for the fuel feed has a minimum gas pressure $p_{min}$ which is markedly above the system-related combustion chamber internal pressure $p_{system\ requirement}$ in the region of the lower load set point. If this requirement cannot be met, the ignition spark for the ignition of a fuel/air mixture forming inside the burner is not released for safety reasons.

Starting from the minimum gas pressure $p_{min}$ within the lower load range, a pressure reference line $p_{action\ limit}$ follows within the range of higher loads L, this pressure reference line $p_{action\ limit}$ rising in proportion to the combustion chamber pressure $p_{system\ requirement}$ and being selected in each case to be greater than $p_{system\ requirement}$ irrespective of the respective load set point.

Furthermore, three further pressure lines are depicted in the diagram shown in the FIGURE; these are, in detail: $p_{protection\ limit}$, $p_{safety\ margin}$ and $p_{loading\ hysteresis}$. The additional three pressure lines all run essentially parallel to the reference pressure line $p_{action\ limit}$, the reference pressure line $p_{action\ limit}$ within the middle and higher load range being derived in the following manner from the load-dependent, system-related combustion chamber internal pressure $p_{system\ requirement}$:

$$p_{action\ limit} = p_{system\ requirement} \cdot a, \text{ with } 1.2 \leq a \leq 1.5, \text{ preferably } a = 1.35$$

With regard to the pressure lines additionally provided in the diagram for $p_{protection\ limit}$, $p_{safety\ margin}$ and $p_{loading\ hysteresis}$, the following conditions preferably apply:

$$p_{safety\ margin} = p_{system\ requirement} \cdot a + 1 \text{ bar,}$$

$$p_{loading\ hysteresis} = p_{system\ requirement} \cdot a + 1.3 \text{ bar and}$$

$$p_{protection\ limit} = p_{system\ requirement} \cdot a - 0.3 \text{ bar}$$

Depending on the type of gas turbine, the factors selected in the above equations may be selected differently.

The normal operation of a gas turbine power plant is effected under sufficiently high gas pressure $p_{gas}$, which at every load set point L is always higher than the reference pressure $p_{action\ limit}$. In the normal operating state therefore:

$$p_{gas} > p_{action\ limit}$$

However, if the gas pressure $p_{gas}$ should drop at an initial load set point $L_0$ selected in any desired manner and reach the pressure value $p_{action\ limit}$ at the initial load set point $L_0$, the gas turbine power plant is automatically deloaded on the basis of standardized fuel throttling at a throttle rate $r_1$ depending on the respective gas turbine power plant.

In the case of the standard deloading, the following cases can be distinguished from one another in principle:

Case 1 (see arrow 1 in the diagram)

Due to the standard deloading, the gas pressure $p_{gas}$ remains largely constant, so that, by means of the load reduction, when a lower load set point $L_1$ is reached, a relative extra increase in the gas pressure $p_{gas}$ relative to the pressure value $p_{action\ limit}$ at the load set point $L_1$ is set, with: $p_{gas} = p_{safety\ margin}$ ($L_1$).

The pressure line $p_{safety\ margin}$ serves as a safety pressure level which is always above the reference pressure line $p_{action\ limit}$. If the gas pressure $p_{gas}$ adapts itself to the safety pressure level $p_{safety\ margin}$ due to reduced fuel feed at a reduced load set point $L_1$, the standard deloading is ended. If the gas pressure $p_{gas}$ also remains constant after the standard deloading and maintains the pressure level $p_{safety\ margin}$ at the load set point $L_1$, the gas turbine power plant can again be changed to the initial load set point $L_0$ in the course of a standard load build-up.

On the other hand, if the gas pressure $p_{gas}$ drops again immediately after reaching the pressure level $p_{safety\ margin}$ at the load set point $L_1$ after completion of the standard deloading and approaches the reference pressure line $p_{action\ limit}$ at the load set point $L_1$, repeated standard deloading to a further reduced load set point $L_2$ (not shown in the diagram) is effected. If the gas pressure $p_{gas}$ adapts itself at the reduced load set point $L_2$ to the safety pressure level $p_{safety\ margin}$ prevailing at this load level, the standard deloading is again ended. If the gas pressure $p_{gas}$ stabilizes, a load build-up from the load set point $L_2$ to the initial load set point $L_0$ is started.

However, if the standard deloading measures described above do not lead back to the desired result with regard to gas pressure stabilization, with the gas turbine power plant subsequently being changed to the initial load set point $L_0$, the gas pressure $p_{gas}$, by step-by-step repetition of the above procedure, reaches the minimum pressure level $p_{min}$, from which further deloading is no longer possible in order to avoid damage.

In this case, only two alternatives A and B remain, namely either an emergency shutdown of the gas turbine power plant, in order to avoid a further drop in the gas pressure below the system-related combustion chamber internal pressure $p_{system\ requirement}$ (case B), or a changeover to an alternative fuel type (case A), for example firing of the combustion chamber with liquid fuel instead of with gaseous fuel. Case A, however, as already mentioned, is only possible in dual burner systems.

The scenario described above describes the case of a pressure loss taking place slowly in the fuel feed line, during which for the most part fuel throttling by means of standard deloading leads to a uniform gas pressure $p_{gas}$, which, when the safety pressure level $p_{safety\ margin}$ is reached, is stabilized again at a reduced load set point $L_1$ and makes it possible to change the gas turbine power plant to the initial load set point.

Case 2 (see arrow 2 in the diagram)

If, on the other hand, a marked and rapid drop in the gas pressure $p_{gas}$ occurs, the reference pressure $p_{action\ limit}$ at the initial load set point $L_0$ is reached relatively quickly. The standard deloading described above is effected automatically in the same way by throttling the fuel feed. The gas pressure $p_{gas}$ certainly does not remain constant in such a case, despite the standard deloading, but rather continues to drop dynamically, but at a slower rate than the reference pressure value $p_{action\ limit}$ dropping due to the standard deloading. In this case, too, during the entire standard deloading, the following always applies: $p_{gas} > p_{action\ limit}$ (L). When the safety gas pressure $p_{safety\ margin}$ is reached at a greatly deloaded set point $L_3$, the fuel throttling by means of the standard deloading is ended just as in the case described above. If the gas pressure stabilizes at the load set point $L_3$, the load set point $L_3$ can be changed again to the initial load set point $L_0$ in the course of a standard load build-up.

Case 3 (see arrow 3 in the diagram)

If, in the event of a pronounced drop in the gas pressure $p_{gas}$ to the reference pressure level $p_{action\ limit}$ at the initial load set point $L_0$, the automatically initiated standard deloading does not lead to desired stabilization of the pressure level within the gas line, and if the gas pressure $p_{gas}$ falls below the reference pressure level $p_{action\ limit}$ despite the standard deloading, an emergency shutdown of the gas turbine power plant becomes unavoidable, in the case of a pressure reduction of the gas pressure $p_{gas}$ to a protective pressure level $p_{protection\ limit}$ which is above the combustion chamber pressure $p_{system\ requirement}$.

In such a case, an emergency shutdown is unavoidable in order to avoid irreversible system damage. As an alternative to the emergency shutdown, the supply of the combustion process with gaseous fuel can be changed over to liquid fuel operation in the case of a dual fuel supply of the gas turbine power plant.

In the case of emergency load relief, the fuel feed is carried out at a far greater throttle rate $r_2$ than in the case of standard deloading. The throttle rate $r_2$ in the case of standard deloading is typically at least 6 times, preferably at least 10 times, the throttle rate $r_1$ which is used during the standard load relief.

In the cases described above in which, by specific standard deloading, the gas pressure $p_{gas}$ can be stabilized at the safety pressure level $p_{safety\ margin}$ which depends on the respective reduced load level, i.e. the gas pressure $p_{gas}$ continues to remain stable for a predeterminable period of at least 1 minute at constant fuel feed, it is necessary to return the gas turbine power plant to the original initial load set point $L_0$. This is effected, as already mentioned, in the course of a standard load build-up, which, as can be seen from the diagram (see dotted line 4), is effected step by step. First of all, it may be noted that the initial load set point $L_0$ at which the pressure drop in the fuel feed line occurred is stored in the system, so that the initial load set point can be specifically restored after corresponding standard deloading. Referring to the diagram, let it be assumed that the reduced load set point adopted by means of the standard deloading is $L_5$, at which the gas pressure $p_{gas}$ has assumed the safety pressure $p_{safety\ margin}$ and increases at uniform load set point $L_5$ to the pressure level $p_{loading\ hysteresis}$, for which: $p_{loading\ hysteresis} > p_{safety\ margin}$, the pressure level $p_{loading\ hysteresis}$ always being greater than the safety pressure level $p_{safety\ margin}$.

When the pressure level $p_{loading\ hysteresis}$ is reached, a standard load build-up is effected by increased fuel feed at a fuel feed rate which depends on the gas turbine power plant and is preferably selected to be constant with respect to time. During the standard load build-up, the gas pressure $p_{gas}$ typically remains constant, the standard load build-up being interrupted when the safety pressure level $p_{safety\ margin}$ is reached at the load set point $L_4$. The gas pressure $p_{gas}$ again increases at the increased load set point $L_4$ until the pressure level $p_{loading\ hysteresis}$ is reached at the load set point $L_4$. The fuel feed is again increased, so that safety pressure level $p_{safety\ margin}$ is reached at the higher load set point $L_3$. The standard load build-up carried out step by step is repeated until the initial load set point $L_0$ is reached.

By means of the method according to the invention, it is possible to improve the availability of gas turbine power plants and to markedly reduce the susceptibility with regard to pressure fluctuations within the fuel feed lines. With the described method, emergency shutdowns will be necessary only rarely, provided the thermal power plant is fired exclusively with gaseous fuel and the pressure drop in the gas line cannot be stabilized despite standard deloading.

In particular in countries and regions in which the supply of gaseous fuel is subject to fluctuations, the method offers a reliable mode of operation of gas-fired thermal power plants, in particular gas turbine power plants.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of operating a thermal power plant in which a rotary unit is driven by burning gaseous fuel inside a combustion chamber, with hot gases being formed, the rotary energy of which rotary unit is converted into another form of energy, and describes a load set point (L) of the thermal power plant, the load set point (L) being set by regulating the quantity of gaseous fuel fed to the combustion process, wherein the thermal power plant is operated at a load set point (L), provided the gaseous fuel is fed to the combustion process through a gas line at a gas pressure $p_{gas}$, with $$p_{gas} > p_{action\ limit}(L),$$

where $p_{action\ limit}(L)$ represents a pressure value which depends on a system internal pressure $p_{system\ requirement}(L)$ set in the region of the combustion chamber by the load set point (L) of the thermal power plant, with $$p_{action\ limit}(L) > p_{system\ requirement}(L),$$

wherein, starting from an initial load set point $L_0$, during a pressure loss in the gas line, as a result of which the gas pressure $p_{gas}$ drops to the pressure value $p_{action\ limit}(L_0)$, standard deloading is carried out by reducing the quantity of gaseous fuel fed to the combustion process, and wherein, depending on a pressure ratio between $p_{gas}$ and $p_{action\ limit}(L)$ forming during reduction of the load, on the basis of a decision criterion, one of the following steps is performed:

i) the standard deloading is ended and the thermal power plant is changed to its initial load set point, or
ii) complete emergency load shedding is carried out, during which the fuel reduction is carried out more rapidly than during the standard deloading, or
iii) the fuel supply is changed over to another type of fuel.

2. The method as claimed in claim 1, wherein, for the case $p_{gas} = p_{action\ limit}(L_0)$, the standard deloading leads to a gas pressure $p_{gas}$ which assumes a pressure value $p_{safety\ margin}(L_1)$ at a reduced load set point $L_1$, for which:

$$p_{safety\ margin}(L_1) > p_{action\ limit}(L_1),$$

the standard load relief is ended and the thermal power plant is changed to the initial load set point ($L_0$) by increasing the fuel feed.

3. The method as claimed in claim 2, wherein, in cases where the gas pressure $p_{gas}$ repeatedly drops to a pressure value $p_{action\ limit}(L)$ after $p_{safety\ margin}(L)$ is reached, the measure described in claim 2 is repeated, and wherein, in the case where the above measure is carried out repeatedly, the gas pressure $p_{gas}$ falls below a minimum pressure value $p_{min}$, either the complete emergency load relief is effected or the fuel supply is changed over to another type of fuel.

4. The method as claimed in claim 2, wherein the thermal power plant is changed to the initial load set point $L_0$ by step-by-step increase in the load set point (L) in such a way that, in the case where $p_{gas} \geq p_{loading\ hysteresis}(L_4)$, with $p_{loading\ hysteresis}(L_4) < p_{action\ limit}(L_4)$, a load build-up of the thermal power plant is carried out at a load set point $L_4$ until $p_{gas}$ corresponds to the pressure value $p_{safety\ margin}(L_3)$ at a higher load set point $L_3$, and if $p_{gas}$ furthermore increases at the uniform load set point $L_3$ and reaches the pressure value $p_{loading\ hysteresis}(L_3)$, the above load build-up is repeated until the initial load set point $L_0$ is reached.

5. The method as claimed in claim 2, wherein the standard load relief is carried out by throttling the fuel feed at a throttle rate $r_1$, and wherein the emergency load relief is carried out at a throttle rate $r_2$, with $r_2 \geq 6 \cdot r_1$.

6. The method as claimed in claim 5, wherein the thermal power plant is changed to the initial load set point $L_0$ once the load set point set at $p_{gas} = p_{safety\ margin}(L)$ has stabilized.

7. The method as claimed in claim 6, wherein the thermal power plant is changed to the initial load set point $L_0$ according to a standard load build-up, provided:

$$p_{gas} \geq p_{loading\ hysteresis}\ \text{and}$$

$$p_{loading\ hysteresis} > p_{action\ limit}\ \text{and}$$

wherein the standard load build-up is carried out at a fuel feed rate depending on the respective thermal power plant.

8. The method as claimed in claim 7, wherein the thermal power plant is changed to the initial load set point $L_0$ by step-by-step increase in the load set point (L) in such a way that, in the case where $p_{gas} \geq p_{loading\ hysteresis}(L_4)$, with $p_{loading\ hysteresis}(L_4) > p_{action\ limit}(L_4)$, a load build-up of the thermal power plant is carried out at a load set point $L_4$ until $p_{gas}$ corresponds to the pressure value $p_{safety\ margin}(L_3)$ at a higher load set point $L_3$, and if $p_{gas}$ furthermore increases at the uniform load set point $L_3$ and reaches the pressure value $p_{loading\ hysteresis}(L_3)$, the above load build-up is repeated until the initial load set point $L_0$ is reached.

9. The method of claim 7, wherein the standard load build-up is carried out at a fuel feed rate which is constant with respect to time.

10. The method as claimed in claim 1, wherein, for the case $p_{gas} = p_{action\ limit}(L_0)$, the standard deloading leads to a drop in the gas pressure $p_{gas}$ to a pressure value $p_{protection\ limit}(L_2)$ at a reduced load set point $L_2$, with $p_{system\ requirement}(L_2) < p_{protection\ limit}(L_2) < p_{action\ limit}(L_2)$, the complete emergency load shedding or the changeover of the fuel feed to another type of fuel is effected.

11. The method as claimed in claim 1, wherein the standard load relief is carried out by throttling the fuel feed at a throttle rate $r_1$, and wherein the emergency load relief is carried out at a throttle rate $r_2$, with $r_2 \geq 6 \cdot r_1$.

12. The method as claimed in claim 1, wherein the thermal power plant is changed to the initial load set point $L_0$ once the load set point set at $p_{gas} = p_{safety\ margin}(L)$ has stabilized.

13. The method as claimed in claim 1, wherein the thermal power plant is changed to the initial load set point $L_0$ according to a standard load build-up, provided:

$$p_{gas} \geq p_{loading\ hysteresis}\ \text{and}$$

$$p_{loading\ hysteresis} > p_{action\ limit}\ \text{and}$$

wherein the standard load build-up is carried out at a fuel feed rate depending on the respective thermal power plant.

14. The method of claim 13, wherein the standard load build-up is carried out at a fuel feed rate which is constant with respect to time.

15. The method of claim 1, wherein the thermal power plant is a gas turbine power plant having a gas turbine stage for converting rotary energy into electrical energy.

* * * * *